United States Patent
Czerniewicz

[15] 3,656,521
[45] Apr. 18, 1972

[54] POWER CHISEL
[72] Inventor: John F. Czerniewicz, 337 Foch Boulevard, Mineola, N.Y. 11501
[22] Filed: June 30, 1970
[21] Appl. No.: 51,205

[52] U.S. Cl..............................144/219, 144/136, 144/144, 408/228, 144/70
[51] Int. Cl..................................B27g 13/00, B27c 5/10
[58] Field of Search...................144/70, 144, 219, 218, 136; 143/85; 408/228

[56] References Cited

UNITED STATES PATENTS

| | | |
|---|---|---|
| 194,221 | 8/1877 | Clarkson..............................144/219 |
| 3,477,481 | 11/1969 | Czerneiwicz..........................144/219 |
| 395,285 | 12/1888 | Manning..............................144/219 |
| 2,202,251 | 5/1940 | Gille..................................144/219 |
| 3,392,762 | 7/1968 | Greenley.............................144/70 |

*Primary Examiner*—Donald R. Schran
*Attorney*—James P. Malone

[57] ABSTRACT

A laterally movable motor driven cutting tool adapted to cut grooves of predetermined depth. The cutting means has a tubular cutting end with a plurality of curved inwardly extending cutting blades formed in said tubular cutting end. Each cutting blade has a cutting spur on its outside edge. A depth adjusting ring and guide means are provided to control the depth and shape of the groove.

4 Claims, 13 Drawing Figures

PATENTED APR 18 1972　3,656,521

INVENTOR.
JOHN F. CZERNIEWICZ

POWER CHISEL

This invention relates to cutting tools and is an improvement over my prior U.S. Pat. No. 3,477,481 granted Nov. 11, 1969, entitled Driven Cutting Tool.

Its purpose is to perform operations ordinarily accomplished through the skillful use of a wood chisel, such as cutting mortises for mortise and tenon joints, dados, grooves, rabbets, and in general, removing areas of wood or other soft material to whatever shape or depth may be required.

Its advantage over the wood chisel, which it supplants, is in the ease with which it is used, requiring very little skill, and the speed with which various operations can be performed. It is much faster than with a hand chisel. It works equally well with or across the grain, or at any angle to the grain. It is safe in use and it can be used with electric drills of any speed, from 450 RPM to over 2,000 RPM.

Used with any straight edge, such as board, it can be made to cut a groove or dado precisely equal in width to the width of the tool, thus cutting a groove, dado or mortise of perfect size for the most common thickness of softwood lumber, when using a ¾ inch cutter. By moving the guide to a new position less than ¾ inch from the first cut, a second cut can be made to produce a groove or dado of greater width. By placing the guide less than ¾ inch from the edge or end of the wood, a rabbet can be cut.

Used with a pair of straight edges separated by a spacer of any desired width, the wood in the enclosed area can be removed to a uniform depth of several inches.

Used with a template or pattern cut out of ¾ inch thick wood and a supporting bridge, it can be made to remove wood to a precise, predetermined depth to the shape of the template, for instance, in hollowing a round or oval recess in a piece of wood.

Thus, whether cutting a groove or mortise with the grain, a dado for a book shelf across the grain, a rabett with or across the grain, or a recess for an inlay or an ash tray, this tool will do the work of a wood chisel supplemented by a hand router.

The tool generally consists of a rotating tubular member, with two, three or more outside cutting spurs and two, three or more inwardly extending cutting chisels, a driving shank and depth control means by an adjustable ring.

The cutting edges of the tool perform three distinct operations. The first, when the rotating tool is placed on the wood to the left of the guide strip and in a slanting position relative to the wood, it bears firmly against the guide strip, and on being moved along, to form a half round groove in the wood. The second step is performed by the knife-like spurs at the outer edge of the cutter with the tool held at or nearly 90° to the surface of the workpiece. These spurs sever the fibers of the wood at the cut being made, so that the edges of a dado being cut across the grain are sharp and not torn away. The third operation is performed by the multiple chisel edges which cut away the stock inside the lines severed by the spurs.

Accordingly, a principal object of the invention is to provide new and improved cutting tool means.

Another object of the invention is to provide new and improved cutting tool means for cutting slots and grooves in wood.

Another object of the invention is to provide new and improved attachment means for a portable electric drill.

Another object of the invention is to provide new and improved motor driven cutting tool adapted to cut grooves comprising a tubular member with two, three or more cutting blades internally located at one end and two, three or more cutting spurs on the periphery of the same end, a shank member suitable for attachment to an electric drill and an adjustable depth ring mounted on the tubular member.

These and other objects of the invention will be apparent from the following specification and drawings of which:

Figure 1:
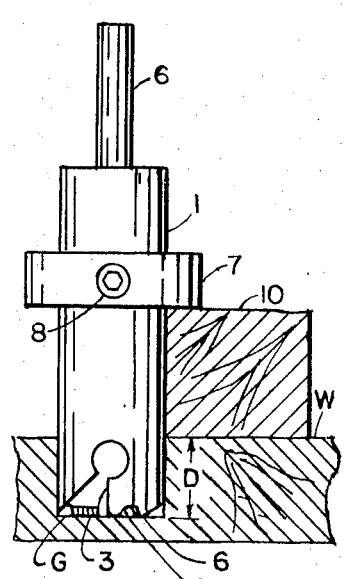
FIG. 1 is a side view of an embodiment of the invention.
Figure 1A:
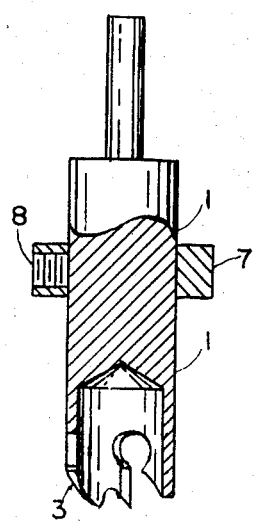
FIG. 1A is a side view partially in section of the embodiments of FIG. 1.
Figure 1B:
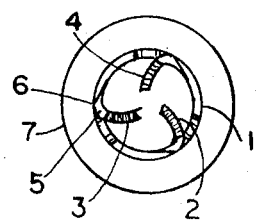
FIG. 1B is an end view of an embodiment of FIG. 1.

FIGS. 1, 1A, 1B illustrate an embodiment of the invention. The cutting member 1 has a tubular shape at its cutting end and has a plurality of inwardly extending blades 2, 3, 4. The upper end of the cutting member 1 has a shank portion 6 which is adapted to be fit into a power drill. Each blade has a notch 5 forming a cutting spur 6. A depth guide 7 is provided which is adjustably connected to the cutting member by means of a set screw 8. The depth guide ring 7 is adapted to ride on guide 10 which is placed on top of the work piece W for the purpose of cutting the groove G. The guide member 10 may be a straight member, or it may be curved, or formed as desired. The adjustment of the ring 7 on the cutting member 1 controls the depth D of the groove.

Figure 2:
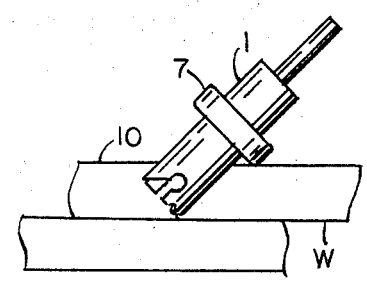
FIG. 2 is a side view illustrating the operation of the invention.

In starting the cutting, the cutting member 1 is held at an angle, illustrated in FIG. 2, with the ring 7 resting on the guide 10, and as the cut is made deeper, the tool is gradually brought up to a vertical position. When the tool is cutting a right hand rotation looking downwardly causes the drill to move to the right against guide 10. A mortise 2 inches deep would require use of a guide for the first inch of depth, and could be completed by use of the cutter alone and with the guide removed.

FIG. 2 illustrates an important principle in the operation of this tool. Right hand rotation, looking down, of the tool tends to roll it across the wood toward the right, i.e. against the guide. As the tool is cutting and is being moved back and forth this tendency holds the tool firmly against the e guide, which must always be to the right of the tool while it is held in the position shown in FIG. 2. After a depth of about one quarter of an inch is achieved, the tool may be held vertically, if desired, because the cut already formed will restrain the tool.

Figure 3:
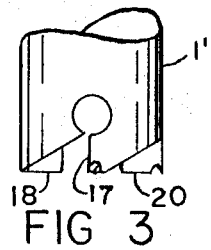
FIG. 3 is a side view of another embodiment of the invention.
Figure 3A:
FIG. 3A is an end view of FIG. 3.

FIGS. 3 and 3A show another embodiment of the invention with four inwardly extending blades 17, 18, 19, 20 cut into the lower end of the cutting member 1'.

Figure 4:
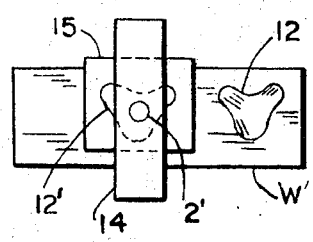
FIG. 4 is a plan view illustrating the use of the invention.

FIG. 4 shows a guide set up for making an irregular cut 12 in the work piece W'. A template 15 having the desired cut out 12' is placed over the work piece and a depth guide member 14 having a hole 2' for the tool 1 is placed on top of the template 15. With this set up the tool can move in all directions necessary to make the irregular cut 12. The depth of the cut is controlled in the same manner with the depth control ring 7.

Figures 5, 5A:
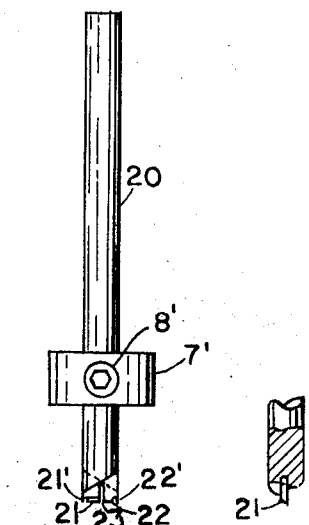
FIG. 5 is a side view of another embodiment of the invention.
FIG. 5A is a detail sectional view of FIG. 5.
Figure 6:
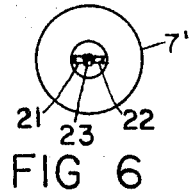
FIG. 6 is an end view of FIG. 5.

The small diameter embodiment of FIGS. 5, 5A and 6 is a solid cylindrical member 20 which has a pair of cutting blades 21, 22, which are in the same plane, and which are separated by a slot 23. Each of the cutting blades has a spur 21', 22'. This embodiment has a similar depth control ring 7' which is set by means of the set screw 8'. The blades are bevelled and sharpened like a conventional wood chisel with a small file.

Figure 7:
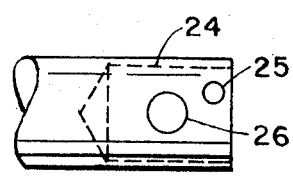
FIGS. 7, 7A and 7B illustrate the manufacturing steps of making the embodiment of FIG. 1.
Figure 7A:
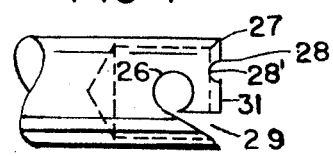
Figure 7B:
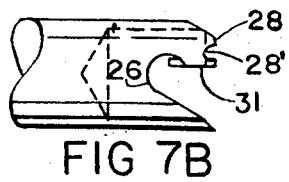

FIGS. 7, 7A and 7B show the manufacturing steps of making the embodiment of FIG. 1 by one method. Other methods may be followed to produce the same resultant shapes.

The blank for the member 1 may be a piece of steel rod. The end is drilled out, as shown by the dotted lines 24, to provide a tubular end. The holes 25 and 26 are then drilled in the side, there being three of each for the three bladed version of FIG. 1. The end of the piece is then cut off along the diameter of hole 25. The edge 27 is then bevelled and sharpened.

Referring to FIGS. 7A and 7B, the end is cut off along the diameter of hole 25 and the hole 25 has been cut in half to form the notch 28' which forms the spur 28. A triangular piece in the area 29 is then milled out. The apex of the triangle intersects the hole 26 so that the portion 31 is free to be bent inwardly with a tool to form one of the cutting blades. The other blades are similarly formed.

FIG. 7B shows the piece 31 bent back into its final position, i.e. being curved inwardly, to form one of the blades.

The invention may be made from high carbon steel drill rod or SAE alloy 4130 which is a chrome-molybdenum steel or equivalent.

I claim:

1. A laterally movable motor driven cutting tool adapted to cut grooves of predetermined depth comprising:
   cutting means having a hollow tubular cutting end,
   a plurality of curved inwardly extending cutting blades formed in said tubular end, said blades curving inwardly into said hollow tubular cutting end, said blades being spaced by uncut sharpened spur portions of said tubular end.

2. Apparatus as in claim 1 having a cutting spur on the outside edges of each of said cutting blades.

3. Apparatus as in claim 2 having depth adjusting means adjustably mounted on said cutting means.

4. Apparatus as in claim 3 having guide means.

* * * * *